3,435,872
SAFETY WHEEL RIM AND BUFFER THEREFOR
Tilden W. Johnson, 5630 Sawtelle Blvd.,
Culver City, Calif. 90230
Continuation-in-part of application Ser. No. 424,745,
Jan. 11, 1965. This application Feb. 9, 1967, Ser.
No. 620,206
Int. Cl. B60b 9/02, 25/00; B60c 19/12
U.S. Cl. 152—158
16 Claims

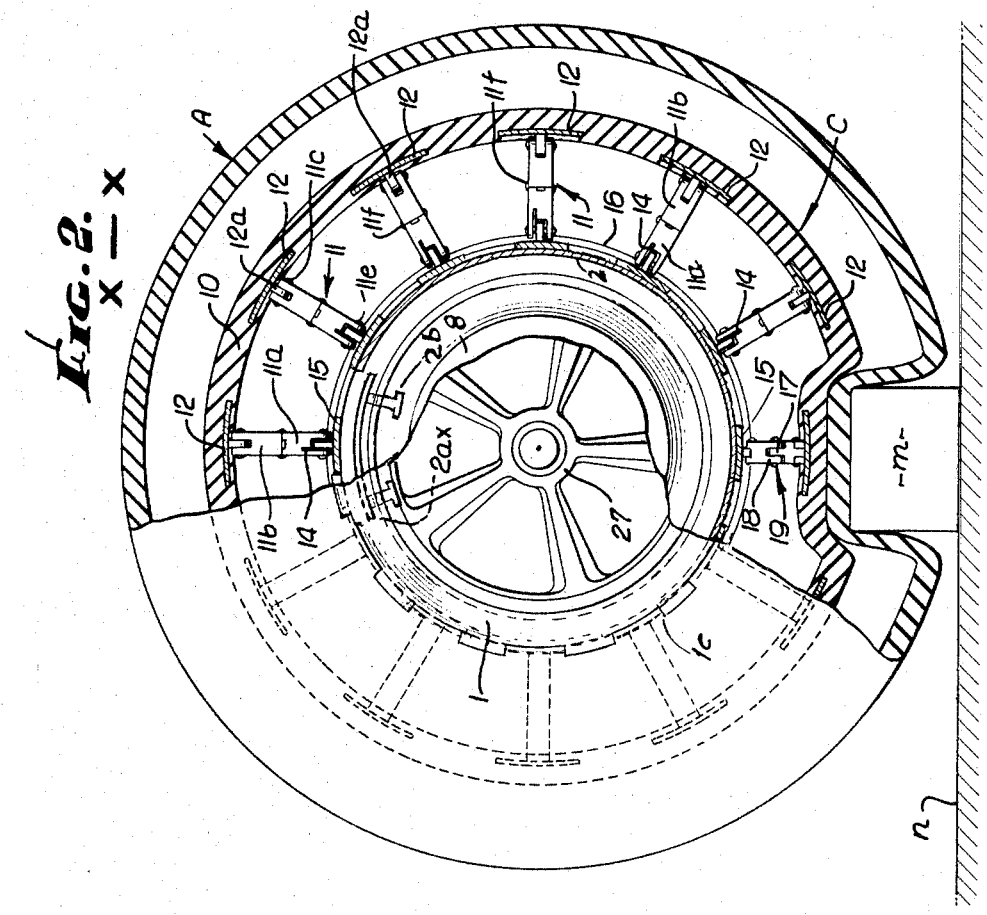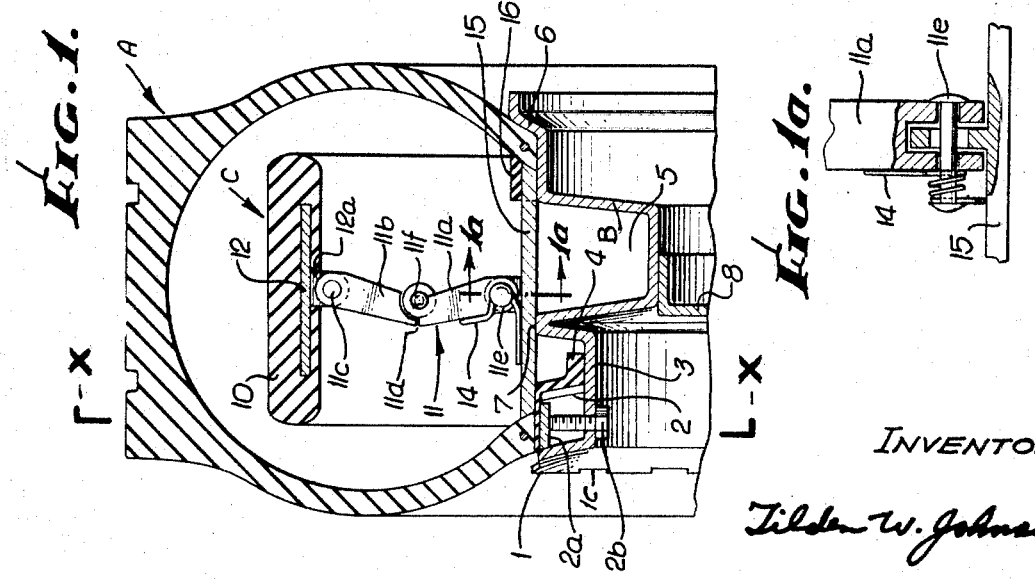

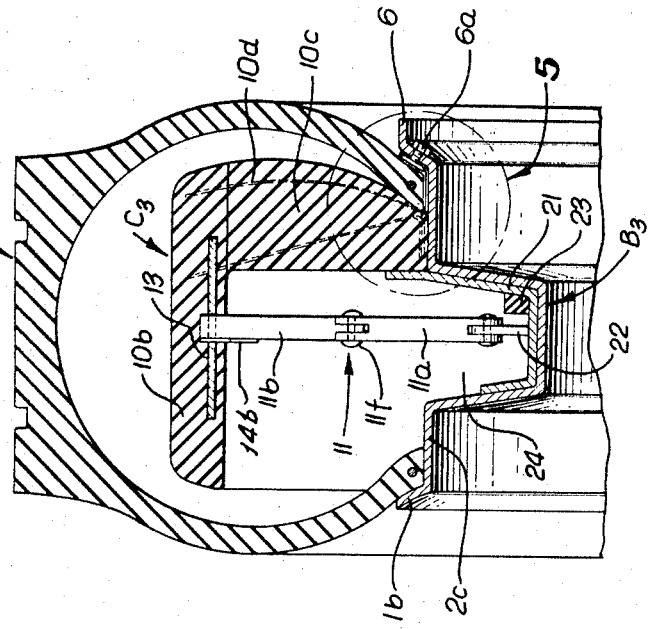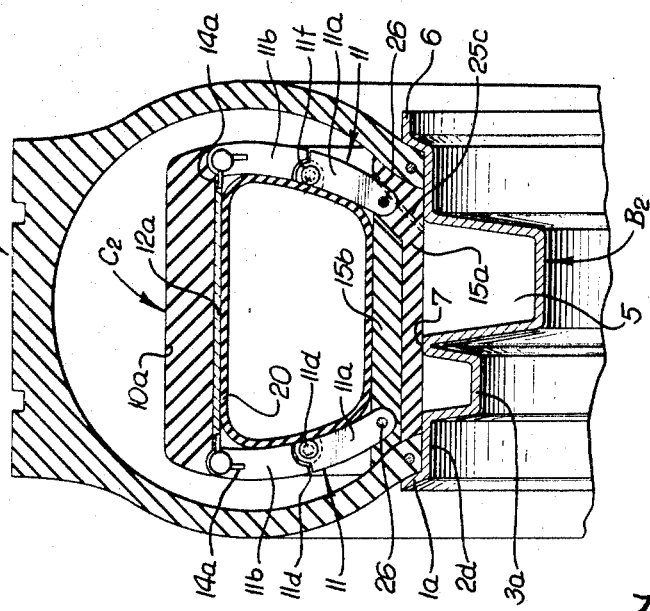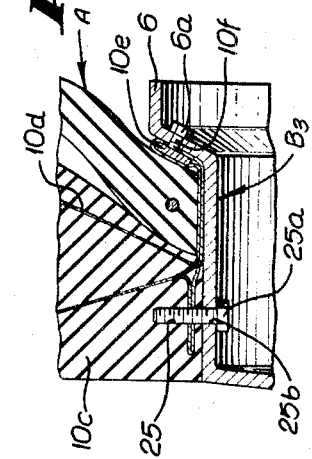

ABSTRACT OF THE DISCLOSURE

A safety wheel for high speed vehicles utilizing flexible rim extensions (buffers) wherein mechanical simulation of air tire performance is attained by short human leg like spokes actuated by small springs (torsion etc.) acting at right angles to the load enabling yielding to shock loads, said spokes having the unyielding normal load characteristics of a wagon wheel, the sway prevention of bicycle spokes and rim flexibility of a tire cap all combined for said mechanical air simulating characteristics.

The rim is specially adapted for use with buffers having one low flange notchable to the same radius as the rim tire bead combined with a flange of sufficient height to permit holes and bolts to hold buffers in lateral position by reinforcements extending under the tire bead. One specie having an adjustable arc in one rim tire bead seat air sealed for tubeless tire use by a rubber membrane over said rim tire bead seat with said adjustable arc section and air sealed by a bead in one rim drop center.

One specie of the flexible rim extending buffer (as in FIGURE 3 formed like a tire and supportable by an air tube that neutralizes the spoke's springs by sidewall pressure) actually increases in diameter and circumference along the cap and weight bearing height upon loss of air.

---

This invention relates to an improved pneumatic wheel consisting in assembly of a tubeless tire enclosing an improved auxiliary wheel inside said tubeless tire consisting of a rim extension to flexibly buffer the said enclosing tire and substantially reduce wheel drop following tire failure, said tire and enclosed buffering device mounted on an improved rim facilitating wheel assembly and higher factor of safety for pneumatic wheels operating at high speed on modern freeways and highways.

The present invention is a continuation-in-part of copending application Ser. No. 424,745 now Patent No. 3,282,321 for "Rims for Safer Pneumatic Wheel Assembly," which in turn was a continuation-in-part of original Ser. No. 175,926 for a "Safety Wheel and Components Therefor," and sets forth matter disclosed in said copending application and further improvements in the said rim components of the safety wheel.

Though the problems associated with inventing wheels suitable for increasing speeds are mountain high as will presently be shown due to the square of the speed for impact of objects on the highways, the development by inventors of wheels to keep pace with constantly increasing highway speeds has materially advanced civilization. At present pneumatic automobile wheels whereby a balloon tubeless tire holds an iron rim about 5 inches from the road surface when fully inflated is very efficient and makes high speed possible, but upon loss of air may become a death trap for the occupants of cars colliding head on in traffic when the car with the failing tire swerves, especially when brakes are applied.

As present space ships circling the earth demonstrate impact force increases with the square of the speed instead of merely increasing in proportion to the speed. Thus the impact force of wheel resistance to passing over, for example, a 4 inch diameter pipe on a highway as the car speed changes from 5 miles per hour to 100 miles per hours is 20 squared or 400 times greater. Thus it is seen that a car traveling 3 miles per hour or at a walking speed can be pulled over said pipe without great strain or impact damage, but at 100 miles per hour the impact on the wheel is over 33 squared or 1000 times greater. To pass over the pipe at 100 miles per hour the entire car or the wheel and axle or only a small section of the tire rubber must suddenly like a bullet acquire a vertical velocity.

Thus a wheel deforming force is created such as occurs in a gun or cannon barrel. Thus the impact force on a wheel passing over said 4 inch diameter pipe at 100 miles per hour can develop a sledge hammer blow equalling 100,000 pounds for a fraction of an inch until required vertical velocity is achieved or the wheel or objects gives. This force can permanently bend and warp a steel wheel strong enough to support a freight car on a smooth railroad track.

A fully inflated tubeless tire solves this problem by requiring only a few ounces of tire rubber to be given the sudden upward velocity upon pipe impact and the impact force is greatly reduced by the ease with which the tire tread gives way on contact with the said pipe object or rock. Now a small impact force can put in motion said few ounces of tire tread rubber. Further the bullet like vertical velocity of said few ounces of rubber does not have enough momentum or foot pounds of kinetic energy to lift the front end of the car materially as the vertical velocity of the few ounces of rubber is halted.

However, in a solid wheel buffer such as an iron buffer covered with hard rubber, the entire weight of the wheel and half of the axle perhaps equalling 100 pounds must be given this upward velocity, and the sledge hammer force created by this 100 pounds of weight resistance to sudden upward velocity which the car axle spring does not prevent is sufficient to permanently bend and warp said iron buffer, damage the car rim, and bend the axle spindle causing steering trouble, and the car to veer on the highway. Further when a weight of 100 pounds is suddenly accelerated vertically like a bullet at the velocity imparted by 100 miles per hour speeds said 100 pounds has momentum or kinetic energy sufficient to lift the entire front of the car several feet into the air before the momentum is checked by resistance of the car to being lifted into the air.

At the present time in 1966 some tire and automobile manufacturers are endeavoring to solve these problems and lessen the estimated 4,000 to 7,000 highway deaths a year attributed to wheel defects and still greater injuries and property damages by installing iron buffers covered with rubber that extend inside the enclosing tire the rim about 1½ inches nearer the inflated tire top. This is about as high as an iron rim can safely be extended by iron buffers and such buffers are as pointed out subject to bending and warping when rocks are hit by the moving car. Other tire and car manufacturers in 1966 are endeavoring to lessen the grossly inadequate factors of safety of mere tubeless tires in road swerves and curve negotiation over rough surface roads and in dirt banks where the factor of safety is sometimes less than half of one by placing a tube inside a tire resembling current tire shields and placing said tire within the enclosing tubeless tire.

While a tire with a tube inside and said tire enclosed by the tubeless tire is an improvement over a tire without same it requires additional expense to manufacture and expense to install. Further there is always the possibility a long nail or other factor may cause both tires to fail at once. Further the driver never has peace of mind and never knows certainly the enclosed pneumatic tire is inflated or has gone flat. Placing a tube inside a tire and then enclosing said tire within a tubeless tire so said enclosed tire does not interfere with the enclosing tire sidewall flexing is an improvement over using tubes inside tires. Tires with tubes against flexing tires at high speeds generate so much heat and the tube also covers the rim interfering with the rim radiating and/or conducting heat from the heated enclosed tire air that temperatures at high speeds develop of 250 degrees and tire tread melts rapidly on the highway (why some drivers only get a few hundred or thousand of miles from a tire). This problem is so severe at freeway speeds and so many tires fail therefrom that further high speed wheel development must forego using tubes inside the road engaging tire. However, when even a tire with a tube inside is placed inside the enclosing tire so heat is reduced as the enclosed tire does not rub the flexing sidewalls of the road engaging tire, still heat builds up because the enclosed tire prevents heated air from reaching the iron or metal rim which could conduct heat from the enclosed air 300 times faster than the tire carcass can. Thus while better a tire within a tire still causes enough heat inside the air of an enclosed tire to build up to partially melt the tire road engaging tread of the road contacting tire. Further if the inside tire fails the combination is then defective in factor of safety in curve negotiation, dirt curves, and road swerves due to sudden traffic congestion or mishaps, and a flat double tire combination can cause highway deaths and injury the same as just one tubeless tire can.

Hard rubber buffers inside tubeless tires bearing directly on the rim causes too much wheel resistance to shock loads, costs money to manufacture and are difficult to install. Further just soft rubber buffers flex too much and generate heat from buffer hysteresis.

In the applicant's opinion the best solution to the problem prior to the invention herein is that set forth in applicant's buffer Patent 3,250,310, wherein lateral stability, height in the tire and greater flexing range and less air space problems are met by applicant's solution of a hard buffer cap over a soft rubber base said hard rubber cap mounted like a wheel spoke over the top of the tire over the top of the rim tire retaining flange. Thus this buffer with holes in the sidewalls lets air to the iron rim and runs cooler and enclosing tires wear longer as there is less tire tread melting. Further this buffer, Patent 3,250,310, with a hard cap supported by its sidewall resting on a firm base flexes little when running on a smooth road, but has provisions whereby a road rock or pipe, etc. encounter shock load will cause the hard sidewall to slide off its firm rim flange top base and allow the hard cap to yield somewhat like a pneumatic tire as the hard buffer sidewall moves laterally outward and radially towards the wheel axle against the enclosing tire sidewalls.

However, the applicant by subsequent research and experiments and stress analysis has discovered a spoke-with-a spring to support a hard rubber buffer and/or rim similar to a wagon wheel that takes up less enclosed air space, flexes through a greater distance and avoids contacting the enclosing tire all making for a flexible air simultating buffer and a rim suitable for such newly developed buffer used in combination with tubeless tires to compose a better wheel. Namely in case the pneumatic tubeless tire fails the high enclosing buffer runs ideally on firm spokes like a wagon wheel with little buffer flexing. However said spokes somewhat resembles the human leg in that few muscles can hold the leg erect and a small spring can hold said spokes erect, but upon shock loads the leg bends in only one direction and can give a great distance from the buttock to the leg angle and so can applicant's buffer spoke with a spring attachment. Further a rock bends only one or two spokes for considerable flexing distance while the spoke fore and aft remains straight and keeps the rim in wagon wheel like position for further even travel on the smooth road with the rock, etc. obstruction.

Thus it is the purpose of this invention to retain all present advantages of pneumatic tubeless tires, but to set forth a novel construction and arrangement and combination of a wheel assembly with a surprisingly useful new function that substantially eliminates the possibility of upsetting wheel drop in case of enclosing tire failure.

It is also the purpose of this invention to eliminate the present low factor of safety of bufferless tubeless tires in sharp curve negotiation sidewall and tire bead stress from the rim, sharp emergency sways to avoid traffic mishaps especially over rough roads, dirt wedging between tubeless tire bead and rim in dirt curve negotiation and to reduce loss of vehicle control following tire failure, to reduce heat build up of enclosed tire air and melting of tubeless tires, and to reduce spring size and weight and buffer construction expenses so buffer will come into general use in tires.

Other objects and advantages of this invention will further become apparent hereinafter and in the drawings in which:

FIGURE 1 shows a typical cross section right side view of one specie of this safety wheel and improved rim and buffer. The tire A is for reference only and may be a substantially inextensible tubeless tire or an extensible bead and sidewall tubeless tire recently invented.

FIGURE 1a is an enlarged cross section taken along lines 1a of FIGURE 1 showing the spring loaded connection of the buffer arm to the rim.

FIGURE 2 shows a fragmentary elevation view showing section X—X in FIGURE 1 and also applies to FIGURES 3 and 4. The letter N represents a road surface and M a wood or pipe or rock road obstruction or sidewalk curb and illustrates how the spoke 11 bends at its center joint 11f as at 19 so the buffer rim cap 10 flexes like a pneumatic tire or human leg. The spoke 11 which can bend in only one direction and is a little off balance but is straight enough so that like a leg a weak spring 14, 14a can hold it sufficiently straight to support say a 1000 pound vehicle load. The mechanical advantage of the spring in this arrangement can be 100 to one or more. However, shock load M at 19 causes the knee 11f to yield. Then the section of the flexible rim 10 yields suddenly like an air tire as the mechanical advantage of the spring and and spoke declines rapidly so the spoke will yield its maximum quickly whereas by contrast the spoke fore and aft still straight can resist and hold the rim in regular round shape with a force of 1000 pounds each. It is difficult to conceive how any other known spring could achieve this ideal operation in a buffer. The illustration is not to scale, a greater scale because of details being used to illustrate the minor drop center functions. Note rim tire bead seat variable location 2ax of arc 2a and how rim 1 can be notched 1c. Also note the rim is continuous and so is item 4 and how item 15 consists of a plurality of spoke bases which in some cases can be slid through notches in rim flange 1. Item 27 is a hub cap for illustration only and is not part of the invention. Item 4 in FIGURE 1 when compressed by a tire is too narrow to show in a scale as small as FIGURE 2 but is continuous between rim bead seat 2 and tire A bead. The torn away part of wheel is for section X—X and thus does not show flange cutouts 1c, but the covered part of the wheel does show cutouts 1c. The spring 14 on all spokes in FIGURE 2 is enlarged as illustrated in FIGURE 1a that accompanies FIGURE 1.

FIGURE 3 shows a cross section right hand view of another specie of rim B designated for differentiation B2 and another buffer specie of C designated here C2.

FIGURE 4 shows a cross section right hand view of another specie of buffer C and rim B designated for differentiation C3 and B3.

FIGURE 5 shows an enlarged sectional view of FIGURE 4 right hand buffer with a reinforced air shield 10d passing underneath the tire bead and item 10e and 6a and a phantom possible bolt 25a.

Referring to the drawings by letters and numerals:

Letter A represents a normal tubeless tire with substantially inextensible beads or a tubeless tire with extensible beads and sidewalls and is for illustration only and no part of this invention except as shown and claimed in combination with new buffer and rim.

Letter B represents one specie of the rim. It is a subject of this invention. Note the minor drop center 3 extends all the way to the least radius tire retaining flange 1, and that separately formed rim tire bead seat 2 is right angled to the bottom of 3. The variable tire bead rim seat arc 2a is a cutout from 2 and 2 is attached to said minor drop center base 3 and said flange 1. An air sealing membrane 4 has a bead with means to form an airtight seal to the main rim in the bottom of the minor drop center 3 like a tire bead. Said membrane 4 is circularly continuous and extends over the entire rim tire bead seat 2 so that no air leakage problem arises from the operation of the variable radius of movable rim tire bead seat section 2a. This variable radius location 2ax of rim tire bead seat arc 2a made variable by bolts 2b enables using the recess created by arc 2a position 2ax as in FIGURE 2 to install the tire bead of A over the rim flange 1. This novel arrangement in combination with other rim features is both necessary and useful where buffer installation requires the use of tire bead to tire bead lateral braces such as 15 that prevents use of the drop centers after buffer installation for tire bead to rest on 2. Note that in some cases cutouts 1c in flange 1 in FIGURE 2 enables the use of continuous unbroken substantially inextensible bead straps 16 to be used instead of said strap being tensionable to a firm fit. Note the major drop center provides more air volume and more heat conducting surface for heated enclosed tire air and rim strength and easier tire and buffer installation. Also the rim has one flange 6 high enough for holes to be drilled therein for bolts to pull and hold to installation buffers and tire bead as in FIGURES 4 and 5, and that 7 the drop center dividing points has the radius height of 2 to support radially and hold laterally buffers of various types. 8 is a fragmentary showing of any rim web not a part of this invention. Numeral 9 is omitted so buffer begins with numeral 10.

The letter B2 represents another specie of said rim B wherein the variable rim tire bead seat arc 2a is not used as the buffer bead 15b and 15a and other type buffer beads over minor drop center 3a is compressible laterally and/or circumferentially stretchable making it possible to use minor drop center 3a for final tire bead installation. 1a represents flange 1 in FIGURE 1, and 2d represents rim tire bead seat 2 in FIGURE 1.

Letter B3 represents another specie of rim B in FIGURE 1 with a single big drop center 24 wherin holes for bolt 6a are drilled through the greatest radius rim flange 6 so bolts attached to air sealing membrane 10d terminating in 10e that comes from the buffer 10c and extending under the bead of the tire A terminates in 10e can be used to pull both the buffer and tire bead on the right hand side to an airtight fit with 6a. The spokes 11 attached to the rim drop center 21, a plurality of metal clips can be secured by 23 strap. Then the rim drop center 24 can be used to install the remaining tubeless tire A over flange 1b. The tapped hole in buffer 10c at 25 shown in FIGURE 5 illustrating section Y of B3 can be used in some cases by use of the bolt shown attaching to the rim opening shown to hold a single buffer on one rim such as section 10c and/or 10c and 10b in lateral and radial directions and extend inches radially, and could have spoke 11 embedded in 10c. 1b represents a low flange as 1 in FIGURE 1 and 2c represents rim tire bead seat a specie of 2 in FIGURE 1. Numeral 25a indicates a bolt attached through rim hole 25b said bolt extending into the tapped hole 25 in buffer 10c.

Letter C in FIGURE 1 represents in cross section the novel buffer shown. It consists of the flexible relatively hard rubber and/or auxiliary wheel rim 10 to which is attached the spoke 11 constructed similar to a human leg, (rivets and holes used for joints) i.e. 11a represents the lower section of 11 attached by a rivet 11e to lateral rim base 15 with a female recess 18 in 11a joining male insert 17 of 11b by rivet 11f. Item 11d prevents spoke 11 bending in one direction. Said spoke section 11b attaches by a rivet 11c to eye hook 12a attached to buffer 10 metal reinforcement 12. Said spoke 11 is held erect by a spring 14 (several types of springs can be used). Said rivets 11c, 11f, and 11e are slightly out of line so unless spring held said spoke tends to bend under load in only one direction. However said variation is so small that a force of a few pounds of spring pressure from spring 14 can hold said jointed spoke straight to support a vehicle weight and load. Thus on a smooth road said buffer rolls as though on unyielding spokes like a wagon wheel, as in FIGURE 2. However upon encountering a shock load in excess of vehicle loaded weight on a smooth road encountering object M on road N, FIGURE 2 said kneelike joint 11d yields and after yielding can easily yield to capacity as at 19, FIGURE 2. If one spoke 11 as at 19, FIGURE 2 completely folds, then the said flexible rim cap 10 will be supported by a spoke fore and aft each still straight and resisting rim distortion with say 1,000 pounds each (an ideal buffer reaction). This enables the buffer cap and/or wagon wheel like rim (flexible) 10 to buffer tires to simulate pneumatic tire performance over road ridges, rocks, etc. see M, FIGURE 2. The lateral brace 15 extends from tire bead to tire bead and circular cable and/or strap 16 can be tensioned and locked to a tight unyielding fit around the plurality of braces 15 over the rim tire bead seats. For convenience of assembly said braces 15 can be held together by a stretchable rubber strap until finally 16 is installed. Cutouts in rim flange 1 as shown in 1c in FIGURE 2 equal in radius to the tire bead seat enables installation of 16 cable in one continuous bead secured to items 15.

It should be noted that since cap 10 cannot sway laterally without elongating or compressing said spokes 11 that the resistance of all spokes 11 to elongation or compression and size of rim 10 controls sway in many cases especially when item 16 is also used at point near 7 and 11e over brace 15. If desirable every other spoke can be set to bend in an opposite direcion. Where lateral sway presents a special problem metal or nylon can extend radially and laterally diagonally from bead strap 16 to buffer item 12a. It should be noted that where a rim flange is as low as item 1 bear strap 16 can be a continuous inextensible cable. This is especially true when a stretch over tubeless tire is used as said bead strap 16 being continuous and inextensible it could still be loaded over the low flange 1 because of the presence of two drop centers. Then since the greatest radius of 1 equals the greatest radius of brace 15 another unbroken metal cable 16 is installable over 1 and braces 15 near the minor drop center or rim point 7.

The letter C2 in FIGURE 3 represents a cross section of buffer shown in FIGURE 3. Buffer cap 10a is similar to 10 in FIGURE 1, and spring spoke 11 is the same. The difference in this specie here from C is that a circular set of spokes 11 are attached to each lateral side of buffer cap 10a over the braces 15a and 15b similar to brace 15. A continuous stretchable rubber bottom piece 15a is used for a bead strap also makes possible the installation of a tire shield tire carcass with air sealing rubber to form tube tire 20 that can be inflated like an innertube note 15a and 15b separate. When 20 is inflated, the air supports the buffer cap 10a with the sidewall pressure over-balancing spoke spring 14a which is here in the coil form. Thus the braces 11 offer little resistance to load when air is inside the buffer tube 20. If air is lost from the buffer tube 20, then the spoke springs 14a restore the spoke 11 to straight, so each spoke 11 can bear full vehicle load without yielding on a smooth road N. This type buffer could have the spokes covered with rubber sidewalls and a road tread added to the buffer cap and operate without an enclosing tire. Numeral 25c is an airhole enabiling en- enclosing tire. Numeral 25c is an airhole enabling enclosing tire flex heated air to reach the iron rim for fast cooling, i.e. hundreds of times faster than through the tire sidewalls. Instead of spoke 11 attachment as in 15 numeral 26 alternately indicates how spokes 11 can be secured by a continuous tensionable attachable and detachable bead strap.

Letter C3 in FIGURE 4 shows in cross section a specie of the buffer shown in FIGURE 1. Here a single broad drop center rim B3 is used. Thus the buffer in FIGURE 1 designated C can use rim anchors located in the bottom of drop center 24 designated 21 and 22 as a plurality of metal clips supporting and attaching spokes 11 and a sidewall 10c added to buffer cap 10b on the rim side with the greatest tire retaining flange radius with said buffer sidewall extending to the rim tire bead seat. One construction of said buffer having nylon and/or synthetic reinforcements 10d extending like a tire shield carcass underneath the enclosing tire bead as in FIGURE 4 section Y illustrated in FIGURE 5 that terminates in a metal anchor 10e to which is attached bolt 6a extending through a corresponding hole in rim flange 6. Said bolt can be used to draw said buffer and adjacent tire bead to an airtight fit and spoke 11 flexed like a human leg so that ankle portion items 21 and 22 are taken to proximity with buffer cap item 13. Then pressure on spoke 11 springs 14a release so said spokes 11 extend full length to the bottom of the rim drop center and fastened securely while in use to said drop center by tensionable and fastenable strap 23. Then said drop center can also be used, space 24, to install the remaining enclosing tire bead ready for use. This covers the former illustration 3 submitted in 424,745, herein submitted as FIGURE 6.

Item 25 shown in phantom in FIGURE 5 represents how a solid rubber tire as section 10c only or 10c combined with the buffer cap 10b can be held in position on one rim flange by inserting bolt shown for buffer 10c tapped hole 25 (which can be air sealing) for an inch or more radially beyond the tire bead seat into the base of said buffer sidewall 10c. Likewise said buffer without said spokes 11 when constructed with shown reinforcements 10d passing as an airsealing tire shield underneath the tire bead with the assistance of items 10e and 6a can use the tire bead as also the inextensible bead strap for the buffer sidewall and bead and to hold 10c in lateral location and prevent dirt wedging tire A' bead in dirt curve negotiation.

From the foregoing, it is apparent I have invented a novel and useful rim and combination that will implement and make easier the use of the novel and useful buffer described all combined into a novel and useful Safety Wheel that will increase the factor of safety of pneumatic wheel assembly and other already expressed objects all of which is the object of this invention.

Several embodiments have been described varying as to buffer, tire and car and rim load requirements. The preferred embodiment therefore is that most adapted to the class of use performed.

The detailed description of the particular embodiments of the invention illustrated and described herein is not to be construed as limiting the invention thereto. The invention includes all features of patentable novely residing in the foregoing description and the accompanying drawings.

I claim:

1. In a wheel comprising a rim, a tubeless tire suitable for enclosing a buffering device, a rim characterized by having in combination one or more drop centers and one rim tire retaining flange only slightly greater in radius than the rim tire bead seat and an opposite side retaining flange having a radius sufficiently greater from the wheel hub than the adjacent tire seat for locating a hole therein sfficient in size to accommodate holding means to locate and hold a buffer in lateral and rotationwise location by said holding means attaching to the terminating anchors of buffer reinforced tire shielded carcass extending under the bead of said tubeless tire whereby said buffer is held laterally inside said tubeless tire preventing dirt wedging of said tubeless tire bead in dirt curve negotiation and uses said tubeless tire bead substantially inextensible bead wire core as the substantially inextensible bead core of the said enclosed buffer.

2. A rim as in claim 1 further characterized by said tire retaining flange with least radius having one or more cutout slots the least radius of said cutout slots equalling the radius of said rim tire bead seats measured from the wheel axle.

3. A rim as in claim 1 further characterized by having in combination a major and minor drop center said minor drop center located immediately adjacent the bead seat adjacent said lesser radius tire retaining flange said minor and major drop centers having a dividing projection point near the lateral center of said rim of a radius equal to said tire bead seats whereby a buffer bearing space is provided on said center dividing radius point so a buffer can bear on said point and the tire bead seat adjacent the major drop center so the minor drop center remains clear sufficiently for use in installing said tire bead.

4. A rim as in claim 1 further characterized by means for installing buffers with lateral braces extending from tire bead to tire bead and means whereby an arc of said rim tire bead seat adjacent said lesser radius tire retaining flange can be lowered radially towards the wheel axle sufficiently to permit the recess thus formed to be used to install a tubeless tire bead over said lesser radius tire retaining flange means to secure an airtight fit despite said arc cutout in said rim tire bead seat by an air sealing membrane having a bead means to form an airtight fit to said rim by seating in said drop center and then extending laterally over said rim tire bead seat with said movable arc and bolt means whereby an airtight fit is secured by forcing said rim tire bead seat arc radially back to a fit with said rim tire bead seat thus compressing said air sealing membrane to an airtight fit with said tire bead.

5. In a wheel comprising a rim, a tubeless tire suitable for enclosing a buffer on said rim, a buffer characterized by having in combination a flexible hard shore material means for forming a wagonlike wheel rim to a buffer said rim having means to attach a spoke wherein holes and rivets form joints and a center joint being bendable in only one direction said buffer spoke having means to anchor to the said rim firmly and means for installing on said rim providing lateral and rotational stability said spokes having spring means capable of holding said spoke straight under vehicle load but regulatable so that a shock load on a road created by a road ridge or projection will overpower said spring and result in said spoke bending at the center joint whereby said buffer cap and or wagonwheel-like rim flexes over road obstructions simulating a pneumatic tire performance.

6. A buffer as in claim 5 further characterized by having in combination a rubber sidewall similar to a solid rubber tire extending from said buffer cap lateral edge to the rim tire bead seat adjoining the tire bead seat said buffer having means to maintain lateral position on said tire bead seat and means to provide buffer springlike characteristics and means to attach the foot of said spoke in the drop center of said rim and means of facilitating installation in said rim.

7. A buffer as in claim 5 further characterized by having in combination two circumferential sets of said spokes one set on each lateral edge of said buffer cap said spokes having means for attachment to the said rim base and means for attaching to said buffer cap and means for providing a continuous seal over the said rim drop centers and a tire shield type of inner tube that can be inflated in said enclosure composed of said buffer cap said spoke formed buffer cap sidewalls and said drop center seal and after said inflation said inner tube will pneumatically support said buffer cap and press sufficiently against the spoke joints that the spring is overcome leaving said buffer cap to depend on air support while the said inner tube is inflated but in case said air inflation is lost said spoke springs straighten said spokes and said spokes then act as wagonwheels spokes to maintain the buffer cap unles a shock is encountered sufficient to overcome said spoke spring tension and permit the said effected spoke to yield to the obstruction.

8. A buffer as in claim 7 further characterized by having in combination said spoked wheel sidewalls so vulcanized that said spokes are enmeshed in a rubber sidewalls to act as wagonwheel-like spokes and support gaging tread added whereby said buffer when inflated acts as a pneumatic tire but in case air is lost the springs on said spoked sidewalls straighten said spokes in said sidewalls to act as wagonwheel-like spokes and support the buffer cap as a flexible wagonwheel rim.

9. A safety wheel having in combination a tubeless tire enclosing an auxiliary wagonwheel type rim extension having means whereby the said wagonwheel rim extension is composed of flexible material and said wagonwheel spokes have joint means to, remain straight under vehicle loads on smooth roads but folding upon encountering road obstructions, said tire and buffer having means to locate laterally and rotationwise on rims having means to facilitate installation and utility of said buffer and said tire.

10. A spring characterized by having in combination a spoke in the form of a rod with joints rotatably fastenable at both ends and near the center lengthwise, said center joint rotatable in only one direction, said joints having means to be so aligned that a load produces a slight tendency to rotate in said rotatable direction at center joint, said joints alignable to achieve a high mechanical advantage enabling a small spring acting at right angles to length of rod to maintain said rod in stable position for desired load setting but upon encountering a shock load said center joint rotates enabling said rod ends to approach each other to close proximity, said rod having means to attach to resilient material that increases resistance to rod end motion after said right angle spring loses said mechanical advantage as center joint rotates whereby said resilient material counteracts tendency of said rod with said right angle spring to offer less resistance after initial yielding and increases rebound capacity of said spring to original static set load bearing position, whereby said spring yields little under static set load but upon yielding to shock loads yields through a greater distance simulating pneumatic load bearing characteristics.

11. A spring as in claim 10 further characterized by a plurality of said springs being joined together to form a continuous uniform flexible wheel rim extension mountable on a wheel rim and enclosable by a tubeless tire and having means to locate on and remain stable laterally on at least one rim tire bead seat.

12. A solid rubber tire buffer as in claim 11 further characterized by having in combination a laterally enlarged cap extending unsupported towards the opposite tire sidewall.

13. A solid buffer as in claim 11 further characterized by combination with said enclosing tubeless tire and a rim to form a safety wheel.

14. A safety wheel as in claim 11 further characterized by having in combination a second set of said spokes supporting the extended lateral edge of said buffer cap at some point towards the opposite sidewall from the tire sidewall having the said original set of circular supporting spokes.

15. A rim characterized by having in combination one or more drop centers and means whereby an arc of one tire bead seat can be lowered radially towards the wheel axle sufficiently to permit the recess thus formed to be used to install a tubeless tire bead over the rim flange means to secure an airtight fit despite said arc cutout in said rim tire bead seat by an air sealing membrane having a bead means to form an airtight fit to said rim by seating in said drop center and then extending laterally over said rim tire bead seat with said movable arc and bolt means whereby an airtight fit is secured by forcing said rim tire bead seat arc radially back to a fit with said rim tire bead seat thus compressing said airsealing membrane to an airtight fit with said tire bead.

16. A rim as in claim 15 further characterized by the rim tire retaining flange, adjacent said lowerable tire bead seat rim arc having one or more cutout slots the least radius of said slots being less than the greatest radius of said flange, and said rim having means to hold in lateral location a buffer bearing on only one rim tire bead seat.

References Cited

UNITED STATES PATENTS

| | | | |
|---|---|---|---|
| 2,941,565 | 6/1960 | Rusch et al. | 152—158 |
| 3,028,900 | 4/1962 | Scott | 152—158 |

ARTHUR L. LA POINT, *Primary Examiner.*

CHARLES B. LYON, *Assistant Examiner.*